Patented Dec. 6, 1927.

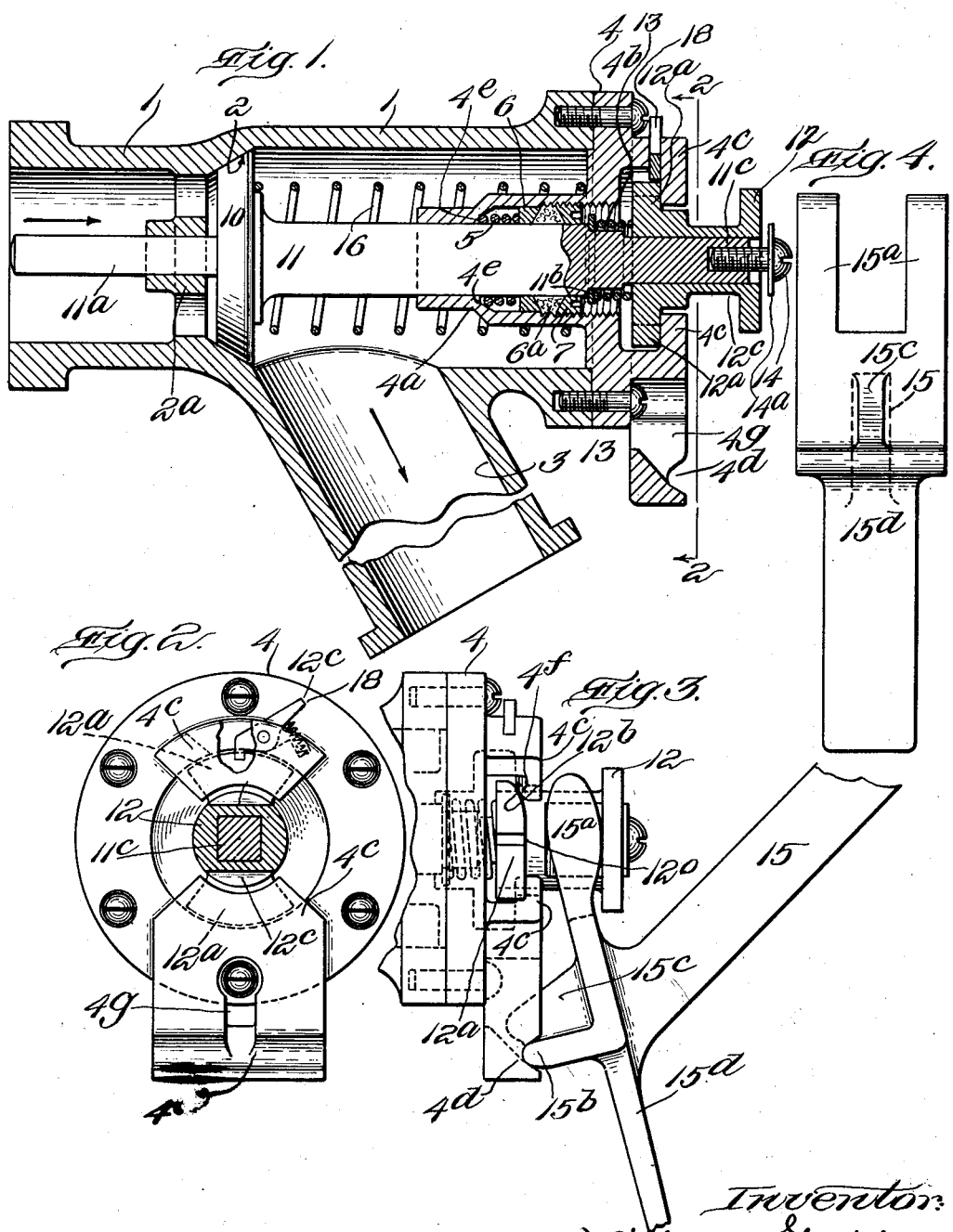

1,652,142

UNITED STATES PATENT OFFICE.

WILLIAM GODDU, OF WINCHESTER, MASSACHUSETTS, ASSIGNOR TO L. S. AVAK & CO., OF BOSTON, MASSACHUSETTS, A COPARTNERSHIP CONSISTING OF LEON S. AVAK, OF WATERTOWN, MASSACHUSETTS, AND K. G. DAGVARIAN, OF BOSTON, MASSACHUSETTS.

VALVE CONSTRUCTION FOR LIQUID-DISPENSING PIPES.

Application filed February 16, 1927. Serial No. 168,583.

This invention relates to valves particularly intended for use on liquid dispensing pipes, especially for such pipes on tank wagons for the carriage and delivery of oil.

Valves for this purpose must be absolutely tight or leak-proof when in closed position and yet must be easily opened for the discharge of oil. Usually it is required that such valves shall be held open by the attendant during the time that the oil is being delivered and, consequently, a very powerful spring pressure, tending to force said valve from open to closed position, is not desirable.

To meet the exacting requirements of these conditions I have devised a construction embracing essentially a valve casing provided with an annular seat against which a plunger valve is normally thrust by spring pressure, in combination with a locking member loosely connected with the stem of the valve in such manner as to impart rotative movement to the valve against its seat, and at the same time produce an access of pressure of the valve against its valve seat, while locking the valve against accidental displacement. This and other features of the invention will be particularly described in the following specification and will be defined in the claims hereto annexed.

In the accompanying drawings I have illustrated a simple and effective construction and arrangement devised for the purpose of satisfying the requirements of the case, in which:

Figure 1 is a central vertical section through the valve casing and valve-actuating parts embodying the principles of this invention.

Figure 2 is an end elevation of the same, the outer end of the valve stem and of its locking member being shown in cross section and positioned to lock the valve against displacement.

Figure 3 is a partial side elevation showing the valve-actuating lever by which the valve is opened and by which it is rotated.

Figure 4 is a view of the valve-actuating lever at right angles to the plane of Figure 3.

In the practice of the invention, according to the form illustrated, the valve casing 1, is provided with an annular beveled seat 2, and outside of or beyond the valve seat, in this case, is the delivery connection or nipple 3 to which the usual hose pipe is coupled for the delivery of the oil.

The outer open end of the valve casing 1 is closed by a cover 4, having flanged screw connection with the end of the valve chamber or casing.

The cover has an inwardly projecting central boss 4ᵃ which is interiorly recessed through its outer portion to leave an inner thrust shoulder 4ᵉ, in order to form a packing gland. This enlarged or recessed portion of the central bore of the boss 4ᵃ, is internally threaded from its outer end inward for adjustably retaining the outer packing ring 7 which, by its rotation, is forced inwardly against the interposed packing ring 6ᵃ, to press it against the inner ring 6 which is yieldingly supported against a stiff helical spring 5, seated upon the shoulder 4ᵉ. Obviously, by screwing inward the outer packing ring 7, the packing material in the intermediate ring 6ᵃ will be compressed firmly against the valve stem in any desired degree of force requisite to prevent leakage, by means of a spanner or other wrench.

The outer portion of the cover 4 is provided with inwardly turned overhanging lugs 4ᶜ, forming thrust members presently to be described. On one side also it has an extension 4ᵈ, formed with a transverse or tangential groove or recess 4ᵍ forming a fulcral seat for a portion of the valve-operating wrench or tool, and also has an interior recess for engagement with a projection on said tool.

The valve 10 is beveled to form a ground joint contact with the valve seat 2, and its stem 11 extends outwardly through the central bore of the cover which forms a bearing guide to preserve the alignment of the valve. A continuation of the stem inwardly of smaller diameter, as shown at 11ᵃ, slides in an inner bearing guide or spider 2ᵃ.

That portion of the valve stem lying immediately beyond the packing ring 7 is reduced in diameter to form an annular shoulder 11ᵇ. This smaller outer end of the stem, in the form illustrated, is slabbed off to leave a square or polygonal extension 11ᶜ, in order to form a splined connection with a sleeve 12, which is loosely fitted over this outer square end of the valve stem to permit a limited sliding movement on the valve stem in an axial direction, while splining or interlocking the two parts together so that the rotation of the sleeve rotates the valve stem. A thrust spring 13 is interposed between the inner end of the sleeve 12 and the shoulder 11$^b$, on the valve stem so as to normaly force the sleeve 12 outwardly, such outward movement being limited, however, by any suitable stop, such as a stop-screw 14 tapped into the end of the valve stem and, preferably, provided with a washer 14$^a$, overlapping the end face of the annularly grooved sleeve 12. On its opposite sides at its inner end the sleeve 12 is provided with sector shaped projections 12$^a$, whose external faces are sloped off, as shown at 12$^b$, to form cam surfaces engaging the inner faces of the overhanging lugs 4$^c$, which also may be similarly beveled off at their ends, as shown at 4$^f$, in Figure 3, to facilitate the cam action when the sleeve is rotated about its axis to bring the sector wings from the idle position between the two lugs or abutments 4$^c$, in order to permit axial movement of the valve to open position.

The neck portion 12$^c$, formed by annularly grooving the sleeve 12, is slabbed off on two sides to make parallel faces for the reception of the jaws of the valve-operating lever. This valve-operating lever comprises a main lever 15, whose inner end is slotted to form jaws 15$^a$, spaced apart sufficiently to embrace the two parallel or flat sides 12$^c$ of the neck portion of the sleeve. At a short distance from its forked end the lever, which is of angular shape, is provided with a projecting web or lug 15$^b$, forming its fulcral portion and adapted to seat in the fulcral groove or recess 4$^d$ in the cover. It may also be provided with a thin web 15$^c$, adjacent to the fulcral member 15$^b$ and projecting somewhat beyond it, as shown in Figure 3, to fit into the radial recess 4$^g$ in the cover so as to prevent lateral displacement when the valve-operating tool is in use. An additional handle 15$^d$ serves as a means for grasping the lever after it is rocked out of engagement with the recesses 4$^d$ and 4$^g$, to permit rotation of the sleeve in order to bring the sector shaped cam members 12$^a$ into thrust engagement with the inner faces of the abutment lugs 4$^c$ of the cover.

A helical compression spring 16, of enlarged diameter, is interposed between the outer face of the valve 2 and the inner face of the cover 4, in order to normally press the valve to its seat in closed position, but this spring is not heavy enough to offer serious resistance to the opening of the valve by rocking the valve tool 15 on its fulcrum, which results in moving the valve outward against the tension of the spring 16. When the lever is released the valve automatically seats itself under a moderate pressure. The operator then swings the lever out of its fulcral and positioning recesses sufficiently to permit rotation of the lever through the handle 15$^b$, which rotation is transmitted to the sleeve 12 and, by reason of the splined connection, to the valve stem and valve. At the same time the locking cams 12, are brought into contact with the overhanging abutments 4$^c$ of the cover, which action produces a powerful inward thrust against the relatively stiff powerful spring 5, so that the valve is forced against its seat with a considerable access of pressure, while at the same time the valve exerts a grinding action upon its seat to clear it of any foreign matter or accumulation of oil so as to make a perfect sealing joint. Not only does the sleeve, therefore, produce this grinding and tightening action upon the valve, but it affords a means for positively locking the valve against accidental displacement since the valve stem can be opened only after the cam members have been released through reverse rotation of the sleeve and valve.

To prevent any possibility of jarring or vibration causing the valve lock to work loose, I may, in some cases, provide a spring-actuated pawl 18, engaging the notch in the periphery of one of the locking wings 12$^a$, when the valve is locked in closed position as shown in Fig. 2. The outer end of this pawl projects far enough to be engaged by the finger to rock the pawl out of such locking engagement.

It will be seen that the valve is readily released from its seat by the turning of the tightening sleeve in the reverse direction, thereby relieving the heavy tension produced by compression of the tightening spring 13 so that by merely rocking the lever 15 on its fulcrum the valve may be easily and quickly opened by a direct axial movement. On the other hand, the outflow of liquid is automatically stopped by the valve-closing spring without having to depend upon any rotation of the valve stem as an adjunct to such closing movement. Hence the valve is easy and quick to open and is instantaneous in its closing, while the partial rotation after such closing locks the valve to its seat so as to positively prevent leakage.

What I claim is:

1. The combination of a casing having an annular valve seat, a plunger valve, a valve-closing spring arranged to oppose a yielding resistance to the opening of the valve, a valve-tightening spring arranged to be normally inactive when the valve is open, and means for applying a powerful thrust upon said tightening spring when the valve is closed to hold the valve against its seat by an access of pressure, whereby the valve is rendered leak-proof while allowing it to be easily opened.

2. A valve construction for liquid dispensing embracing a valve casing provided with an annular seat, a plunger valve, a valve-closing spring opposing a yielding resistance to the opening of the valve, a tightening spring arranged to exert no axial thrust against the valve when in open position, a valve locking means arranged to strongly compress said tightening spring and cause it to exert a strong end thrust forcing the closed valve tightly against its seat when the locking means is moved to locking position.

3. A valve construction for liquid dispensing embracing a casing provided with an annular valve seat, a spring-closed plunger valve normally held against said seat by said spring, a valve-locking and tightening member loosely connected with the stem of the valve to impart rotative movement to said valve against its seat and hold it locked there against accidental displacement, and a valve-opening lever fulcrumed on the casing to lift the valve from its seat by direct axial movement.

4. A valve casing provided with an annular valve seat, a spring-closed plunger valve normally thrust against said seat by its spring, a slidable sleeve splined to the stem of the plunger valve to permit limited axial play, a thrust spring interposed between said sleeve and a shoulder on the valve stem, and means for compressing the thrust spring against the valve stem by the rotation of the sleeve.

5. A valve for liquid dispensing embracing in its construction a casing provided with an annular valve seat, a self closing plunger valve normally spring pressed against said seat, and means loosely connected with the stem of said valve to impart to the valve simultaneously a rotative movement and an access of thrusting pressure toward its seat whereby the valve is given a grinding action against its seat and is held more tightly thereon to prevent leakage.

6. The combination with a valve casing having an annular valve seat, of a cover formed with an axial bore, a self closing spring actuated plunger valve whose stem passes through the bore of the cover, a locking and tightening sleeve splined on said stem to have a limited sliding movement thereon, a lever adapted to impart alternate axial and rotative movements to said sleeve and valve stem said sleeve having thrust cam members movable into engagement with fixed thrust abutments when the sleeve is rotated in order to cause the valve to be thrust more powerfully against its seat and to lock the valve against accidental displacement.

7. The combination with a valve casing having an annular valve seat, of a cover formed with an axial bore, a spring-closed plunger valve whose stem projects through and beyond said cover, a sleeve splined to said stem and slidable between two spaced stops thereon, said sleeve being provided with peripheral projections arranged to exert axial thrust of the valve against its seat when the sleeve is rotated to force said projections against thrust-receiving and locking portions of the cover.

8. The combination with a valve casing having an annular valve seat, of an axially bored cover, a spring closed plunger valve whose stem projects through said cover, said bore being provided with packing rings to prevent leakage around the stem, a valve opening and locking sleeve having splined slidable connection with the outer end of the valve stem to impart axial movement to the valve to open it, and rotative movement to the valve when in closed position, whereby the valve seat is ground clean and the valve is tightened against its seat.

9. The combination with a valve casing having an annular valve seat, of an axially bored cover, a spring closed valve whose stem projects through the bore of the cover, a valve opening and locking member arranged on the outer end of the stem and adapted to be engaged by an operating lever to be moved axially to open position and to be moved rotatively to locking position when the valve is closed.

10. The combination with a valve casing having an annular valve seat, of a cover provided with thrust-sustaining abutments and having a fulcral seat for a valve-operating lever, a spring closed plunger valve whose stem projects through said cover, lever engaging means on the outer end of said stem to move the valve outwardly when the lever is rocked on said fulcral seat and to be rotated by said lever when the valve is closed in order to be moved to valve-locking position, and a lever adapted to open the valve through said lever-engaging means when fulcrumed on its seat and to rotate the valve when disengaged from said fulcral seat.

11. The combination with a valve casing having an annular valve-seat, a plunger valve normally spring pressed against said seat, means for rotating and locking said valve tightly against the seat and releasable means for retaining the valve against accidental rotation from locked position.

In witness whereof, I have subscribed the above specification.

WILLIAM GODDU.